Patented July 5, 1938

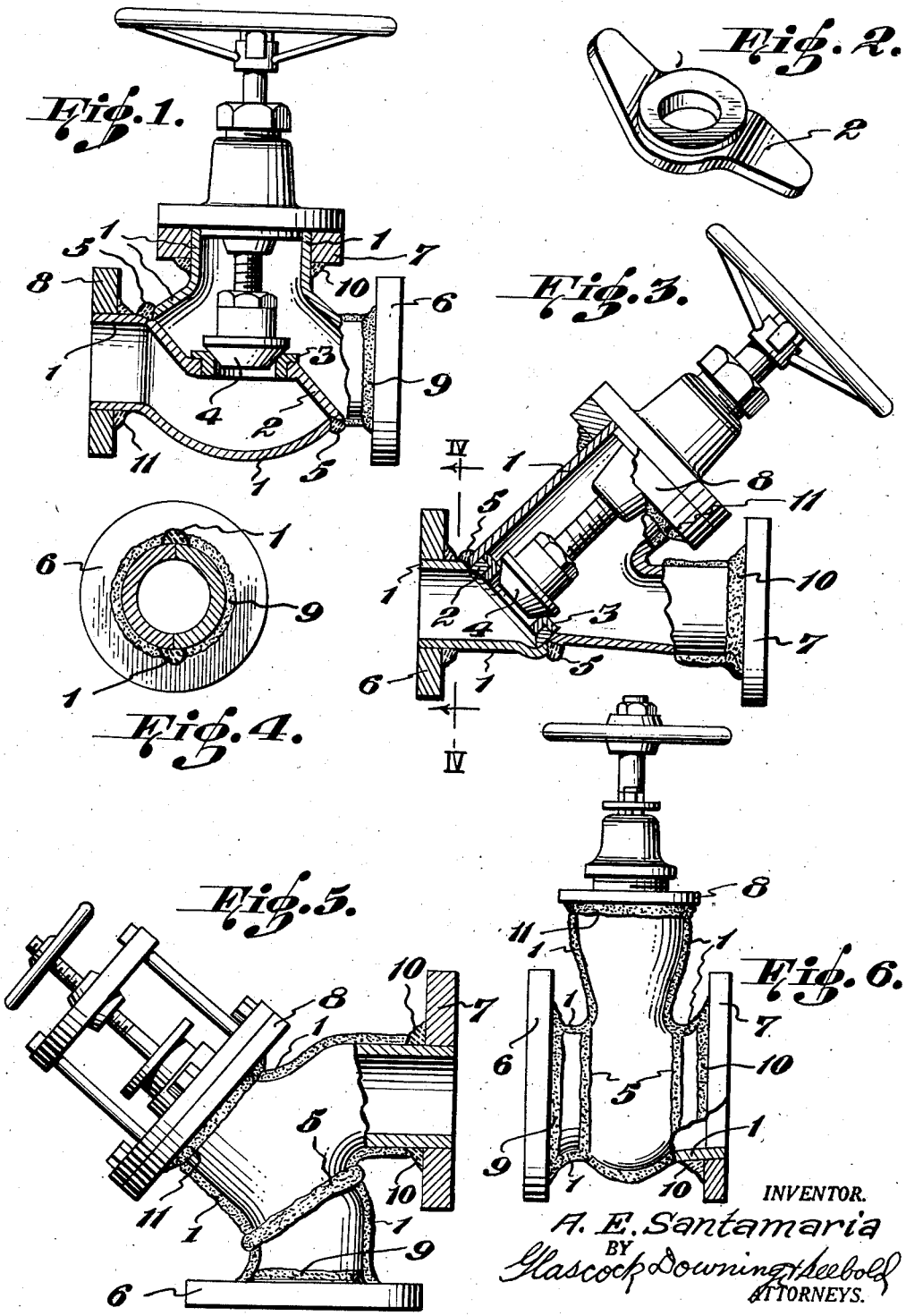

2,122,957

UNITED STATES PATENT OFFICE 2,122,957

METHOD OF MAKING VALVE BODIES

Aristodemo Emilio Santamaria, Genoa, Italy

Application August 5, 1935, Serial No. 34,804
In Italy August 8, 1934

2 Claims. (Cl. 29—157.1)

The present invention relates to improvements in valve construction and manufacture of the bodies of valves and the like.

The bodies of valves and like devices such as cocks, slide valves, gate valves, etc., destined to be used in connection with pipings for water, steam, corrosive liquids, etc. have been usually manufactured heretofore from either cast iron, steel or other alloys or with stamped or pressed sheet metal members welded together without a special rule.

The common method of manufacture by melting presents however various inconveniences and especially those peculiar to the bodies obtained by casting. Consequently there is a necessity for complex and expensive patterns to avoid faulty castings which often result and are noticeable only after breakage has taken place during use. All this leads to the obtaining of heavy valves at a greater cost of manufacture and sale and presents inconveniences of utilization. On the other hand, the rough cast parts have to be subsequently fashioned by means of machine-tools, which involves a further increase in the cost of manufacture.

It has also been customary to manufacture bodies of valves and the like from wrought material, but this method presents the drawback due to a very high cost of manufacture which is still further considerably increased by the subsequent machine work.

Furthermore, the employment of cast iron, entails the inconvenience, characteristic thereof consisting in producing valves which absolutely lack elasticity and which, under the stresses due to the now prevalent very high fluid pressures, as for instance from hydraulic impact in pressure pipings are likely to cause permanent deformations, with dangerous consequences.

Valve bodies made of elastic material such as iron and steel have indeed been suggested using tubing suitably cut and welded together, but either the shapes adapted for the various details or the proper lines of welding, or an unsuitable selection of material with which the solderings are effected, have caused this method to give no practical results and they lack especially the various requirements of resistance for the passage of the fluids, etc. A kind of valve, the body of which results from the junction (by soldering or welding) of several members of sheet metal and with flanges welded to the body, has been proposed, but these bodies, owing to their constitution of sheet metal portions which gives a high degree of elasticity, do not present the necessary stiffening and strengthening action against the deformations caused by the internal pressure of the fluid on the valve body; and this brings among other things a very dangerous deficiency of tightness.

The bodies of valves and the like, according to the present invention, are formed of elementary pieces of sheet material such as iron, steel or the like, and of annular elements applied upon the tubular ends of the body so as to form flanges, the elementary pieces and the annular elements being joined together by welding, the lines of which being arranged on surfaces whether plane or curved which are so directed relatively to each other that the welding lines using appropriate resistant material, constitute a resistant cage or skeleton which, in addition to providing its resistant action, also cooperates to render all the elementary portions of the valve body more resistant. The body is thus provided with the necessary stiffening and strengthening so that the web may exactly adhere to its seat in each condition of pressure.

For this purpose and as long as the conformation of the valve permits, one of the said lines of welding is included within the plane of symmetry of the body to be constructed, and the other line or lines are contained in the plane or curved surfaces normal to the said plane of symmetry.

In general, according to the present invention, the body of the valve presents a welding line corresponding to the perimeter of the diaphragm which carries the valve seating, and such welding line serves to connect the said diaphragm, the edge of which extends up to the external surface of the body of the valve or cock, directly to the two other parts of the said body which precede or follow the said diaphragm in the direction of the fluid flow.

Besides what has been previously indicated in connection with the resistant cage or skeleton, such particular conformation also permits of securing quick and economic work as well as a perfect welding between the said two external parts of the said body and the diaphragm carrying the seating for the valve. Because of the fact that the welding line is entirely exterior and accessible upon the body to be constructed this enables the checking and examination for ascertaining whether the weld is right or not and fully water-tight or for carrying out all the operations such as heating, hammering, grinding, which have subsequently to be effected along the welding line.

Finally, the method of manufacture according to the present invention consists in so shaping the several sheet metal pressed elements as to maintain the same shape in the valve bodies as those known in practice and commerce, thereby facilitating the commercial operations. The various elements of the valve also retain their usual sizes which assure that the fluid flowing therethrough is in the same good condition as attained with known types.

Another very important advantage is afforded by the foregoing features: and, thanks to the quality of the material employed and to the resistant skeleton constituted by the welding lines, the body of the valve presents a much greater lightness and simultaneously a much greater resistance to deformation than the known types made from cast material. Furthermore, it has also been found that when the material constituting the valve body has been stressed beyond the admissible range because of shocks or abnormal stresses, the deformed body does not break.

The accompanying drawing illustrates by way of example, some embodiments of the invention.

Fig. 1 shows, partly in elevation and partly in section, the body of a valve;

Fig. 2 is a perspective view of the diaphragm designed to carry the seat of the valve before such diaphragm is welded to the other elements to constitute the body of the valve;

Fig. 3 is a view in elevation and partially in axial section of another embodiment of the valve body;

Fig. 4 is a transverse section according to line IV—IV of Fig. 3; and

Figs. 5 and 6 show partially in elevation and partially in axial section, two other embodiments of the invention.

In all the modifications illustrated, the valve bodies are constituted by individual plate elements, suitably shaped and joined together by means of welding lines. The shape of the individual members constituting the body of the valve is such as to give the valve the same shape and proportions as those of known valves. One of such welding lines lies in the plane of symmetry of the body of the valve and is designated by I—I in all the figures. Another welding line 5 lies along the periphery of the diaphragm 2 that is destined to carry the seat 3 of the valve disk 4. This diaphragm may be flat, as shown in Fig. 3 or curved as shown in Figs. 1 and 2. In certain cases, as for example in Fig. 6, there may be two seat-carrying diaphragms. In such case the welding lines 5 will be two. The welding lines 5 lying along the periphery of the diaphragm 2 and which weld the diaphragm 2 to the elements lying on both sids of the diaphragm itself are arranged upon a surface which is normal to the plane of symmetry of the body of the valve and which contains the welding line I—I. The welding line along the periphery of the diaphragm which carries the seat of the valve intersects the welding lines included within the plane of symmetry of the body of the valve in intermediate points of such lines. Rings or flange members 6, 7 and 8 are arranged upon the tubular ends of the envelope thus formed and such rings are connected to the body by means of the welding lines 9, 10, 11 each of which lies in a plane that is normal to the plane of symmetry of the envelope and therefore also to the welding line I—I arranged in the plane of symmetry.

As shown in the drawing, each welding line intersects perpendicularly with another welding line at two points. From the foregoing it also follows that the welding lines lying upon surfaces perpendicular to each other intersect perpendicularly and that the welding lines along the diaphragm intersect the welding lines arranged in the symmetry plane of the valve at intermediate points of said lines. Consequently, the welding lines constitute a stiffening and stengthening cage for the body of the valve with a view to reducing the deformations of the valve body, as well as to making such valve body sufficiently resistant against the action of relatively high pressure. This also accounts for the manner in which a maximum of stiffening and strengthening action is secured through the provision of the welded cage, as well as for the fact that the valve disk will fit exactly upon its seat even under high pressures.

The several sheet metal pressed elements are so shaped as to maintain the same shape in the valve bodies as those known in practice and commerce thereby facilitating the commercial operations.

It is obvious that not only the illustrated valve bodies, but also those of valves of any other shape can be constructed in accordance with the present invention.

Having now particularly described and ascertained the nature of my said invention and in what manner the same is to be performed, I declare that what I claim is:—

1. A method of manufacturing valve bodies which comprises, shaping sheet metal into several parts to form a body for the valve and a seating diaphragm, welding said parts together, one of said welding lines being along the periphery of the seating diaphragm so that it directly joirs the diaphragm to the elements lying on both sides of the diaphragm, and thereafter arranging flange members upon the ends of the body and welding the flange members to the body, said welding lines, said parts of the valve and the shape of the several parts of sheet metal being so chosen that the lines of welding connecting these parts constitute a reinforced case, the lines of welding formed on straight and curved surfaces intersecting perpendicularly with each other at intermediate points of said lines.

2. A method of manufacturing valve bodies from sheet metal in accordance with claim 1 wherein each line of welding is made to meet at two points in its length with at least one other line of welding at intermediate points of the lines of welding.

ARISTODEMO EMILIO SANTAMARIA.